United States Patent [19]

Motoyama

[11] Patent Number: 5,568,618

[45] Date of Patent: Oct. 22, 1996

[54] METHOD AND APPARATUS FOR CONTROLLING AND COMMUNICATING WITH BUSINESS OFFICE DEVICES

[75] Inventor: Tetsuro Motoyama, San Jose, Calif.

[73] Assignees: Ricoh Company, Ltd., Tokyo, Japan; Ricoh Corporation, San Jose, Calif.

[21] Appl. No.: 562,192

[22] Filed: Nov. 22, 1995

Related U.S. Application Data

[63] Continuation of Ser. No. 426,679, Apr. 24, 1995, Pat. No. 5,537,554, which is a continuation of Ser. No. 282,168, Jul. 28, 1994, Pat. No. 5,412,779, which is a continuation of Ser. No. 902,462, Jun. 19, 1992, abandoned, which is a continuation of Ser. No. 549,278, Jul. 6, 1990, abandoned.

[51] Int. Cl.$^6$ .................................................. G06F 13/00
[52] U.S. Cl. .................... 395/280; 395/183.22; 355/203; 358/442
[58] Field of Search ..................................... 395/280, 281, 395/821; 355/203, 204, 205, 206; 358/442

[56] References Cited

U.S. PATENT DOCUMENTS

| | | | |
|---|---|---|---|
| 4,947,345 | 8/1990 | Paradise et al. | 358/442 |
| 4,965,676 | 10/1990 | Ejiri et al. | 358/406 |
| 5,084,875 | 1/1992 | Weinberger et al. | 395/183.22 |
| 5,412,779 | 5/1995 | Motoyama | 355/203 |

*Primary Examiner*—Glenn A. Auve
*Attorney, Agent, or Firm*—Oblon, Spivak, McClelland, Maier & Neustadt, P.C.

[57] ABSTRACT

A method and apparatus for controlling and communicating with business office devices, such as copiers, facsimiles and/or printers. The present invention communicates and controls various modules of business devices which allow an external device such as an operation panel to access the state of a target device, such as a copier, printer or facsimile. The operation panel can communicate with the target device and control the same target device. Also, a remote diagnostics station can provide remote diagnostics of the target device.

7 Claims, 7 Drawing Sheets

TYPE
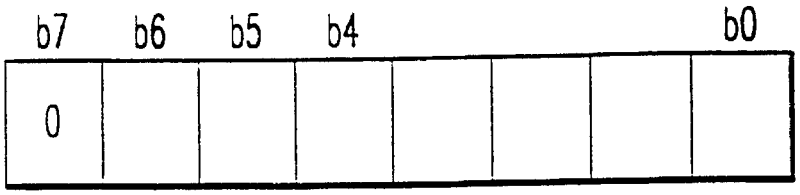
| INFORMATION | TYPE NUMBER |
|---|---|
| 00 NORMAL | 1-30 TYPE |
| 01 ERROR | |
| 10 COMPOSITE | 11111 EXTENSION.....00H 00H |
| 11 URGENT | |
LENGTH
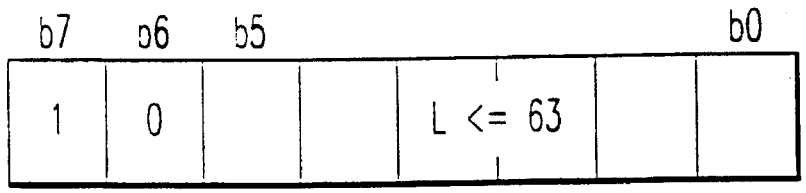
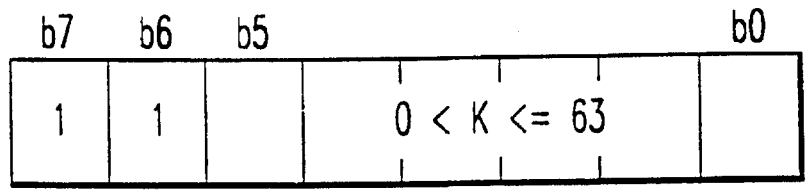
FOLLOWING K BYTES SPECIFY THE LENGTH
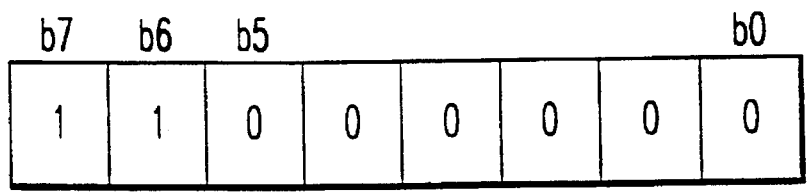
INDEFINITE
*FIG. 3*

| Engine | Panel | Data | Comment |
|---|---|---|---|
| Power On | Power On | | |
| 1 ←----- | | 02, 81, 02 | Identifying as Ope. Panel Engine is busy for power-on reset |
| 2 -----→ | | 02, 81, 01 | Engine identifying itself |
| 3 ←----- | | 01, 81, 02 | Ack Identify (02) |
| 4 ←----- | | 02, 81, 02 | First Identify timed out. Try again |
| 5 -----→ | | 01, 81, 02 | Ack Identify (02) Connection established. |
| 6 ←----- | | 03, 81, 04 | # of copies specified. |
| 7 -----→ | | 01, 81, 03 | Ack # of copies (03) |
| 8 ←----- | | 04, 80 | Start |
| 9 -----→ | | 01, 81, 04 | Ack Start (04) |
| 10 -----→ | | 61, 80 | Paper Jam |
| 11 ←----- | | 01, 81, 61 | Ack Paper Jam |

FIG.—4

| ENGINE | DIAG. | DATA | COMMENT |
|---|---|---|---|
| ----→ | | 02, 81, 03 | IDENTIFYING DIAGNOSTIC SYSTEM |
| | ←---- | 01, 81, 02 | ACK IDENTITY |
| ----→ | | 06, 81, 01 | INQUIRY IDENTITY |
| | ←---- | 41, 86, 01, 81, 06, 07, 81, 01 | COMPOSITE ACK. ACK INQUIRY & REPORT MODEL = 1 |
| ----→ | | 06, 81, 02 | INQUIRY MODEL |
| | ←---- | 41, 86, 01, 81, 06, 07, 81, 02 | COMPOSITE ACK. ACK INQUIRY & REPORT MODEL = 2 |
| ----→ | | 09, 84, 00, 01, 00, 02 | PARAMETERS (1, 2) REPORT |
| | ←---- | 21, 81, 09 | COMMAND NOT UNDERSTOOD |
| ----→ | | 08, 84, 00, 00, 01, C1 | REPORT ADDRESS (01C1) CONTENT |
| | ←---- | 01, 81, 08 | ACK |
| | ←---- | 07, 87, 00, 00, 01, C1, 3D, FF | REPORT 01C1 = FF |
| ----→ | | 01, 81, 07 | ACK |

*FIG. 5*

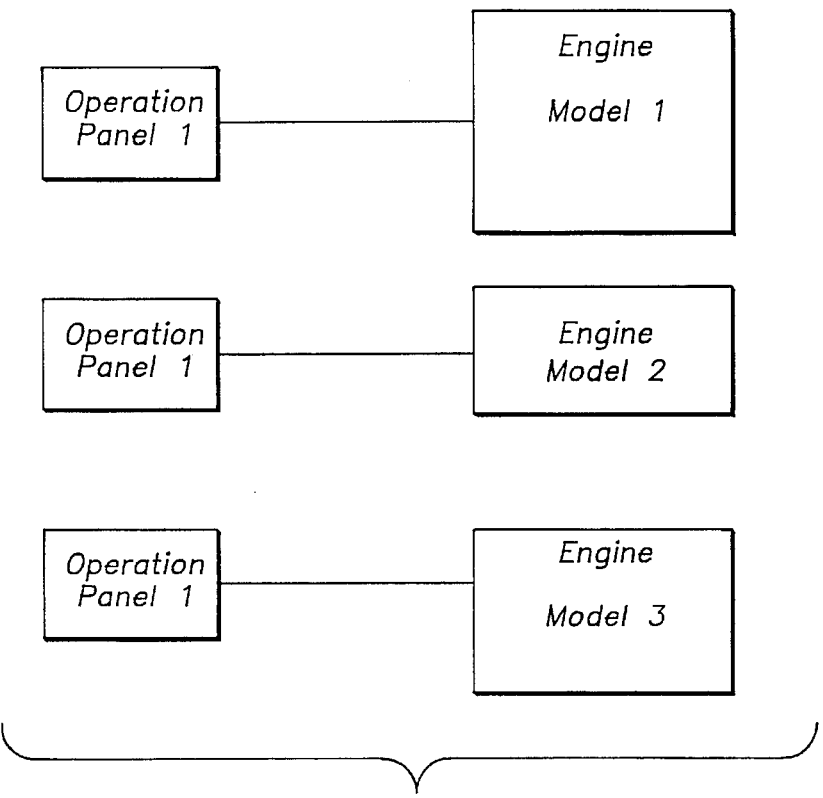
FIG.—6
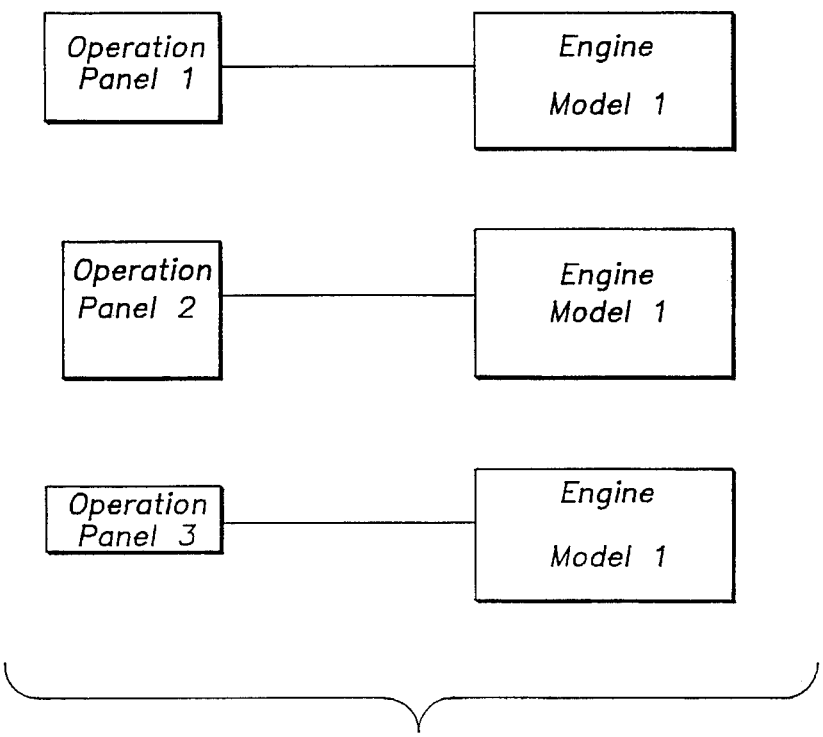
FIG.—7

METHOD AND APPARATUS FOR CONTROLLING AND COMMUNICATING WITH BUSINESS OFFICE DEVICES

This is a Continuation of application Ser. No. 08/426,679 filed on Apr. 24, 1995, now U.S. Pat. No. 5,537,554, which is a Continuation of application Ser. No. 08/282,168, filed on Jul. 28, 1994, now U.S. Pat. No. 5,412,779, which is a Continuation of application Ser. No. 07/902,462, filed on Jun. 19, 1992, now abandoned, which is a Continuation of Ser. No. 07/549,278, filed Jul. 6, 1990, now abandoned.

BACKGROUND OF THE INVENTION

The present invention relates to a method and apparatus for communicating and controlling various types of business office equipment or devices transparently and uniformly. The types of business equipment could be copiers, facsimiles and/or printers.

The creation of business office devices such as a copier, facsimile or printer requires activities assigned to various groups which must be integrated into at a certain time. In addition, once the device goes to customers, it must be maintained by a field service group. Therefore, different groups of people work together to develop and maintain the product.

The current trend of using microprocessors in business devices increased the capability of the devices. For example, high speed copiers usually have more than one microprocessor performing various tasks, including an operation panel consisting of many buttons and displays, controlled by a microprocessor.

As the use of microprocessors increases, a shortage of software engineers becomes critical. Fathi and Armstrong (1985) showed the cost ratio of development between hardware and software as 1 to 5.3. The current practice of developing devices, particularly stand-alone devices such as copiers, tends to ignore reusability of software across different models. For example, an operation panel of a copier is programmed by an engineer who develops the software of the main controller. The software is closely tied to a particular model and usually cannot be used by other copier models. If this trend does not change, the development of various modules by different groups cannot be easily integrated. Moreover, the shortage of software engineers is likely to limit the number of product developments and modification.

SUMMARY OF THE INVENTION

The foregoing problems can be solved and product development cycles can be shortened by providing a means and corresponding method to communicate and control various modules of a device across models and products. This allows several groups to start developing modules using existing devices rather than waiting for a target device to be developed. In addition, field service organization can support diagnostic and maintenance activities with one intelligent system, rather than having different systems for various products.

It is therefore an object of the present invention to provide an improved means and method of allowing an external device or devices to access the state of the target device(s), to communicate with the target device(s) and to control the target device(s).

Additional objects, advantages and novel features of the present invention will be set forth in part in the description which follows and in part become apparent to those skilled in the art upon examination of the following or may be learned by practice of the invention. The objects and advantages of the present invention may be realized and attained by means of the instrumentalities and combinations which are pointed out in the appended claims.

BRIEF DESCRIPTION OF THE DRAWINGS

The accompanying drawings which are incorporated in and form a part of this specification illustrate and embodiment of the invention and, together with the description, serve to explain the principles of the invention.

FIG. 3 depicts an encoding scheme which can be used for communication with the present invention.

FIG. 4 depicts an example of a handshake between a copier engine and operation panel after power-up.

FIG. 5 depicts an example of how a diagnostic station can be connected in accordance with the present invention.

FIGS. 6–8 show examples of other embodiments of the present invention.

DETAILED DESCRIPTION OF THE INVENTION

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
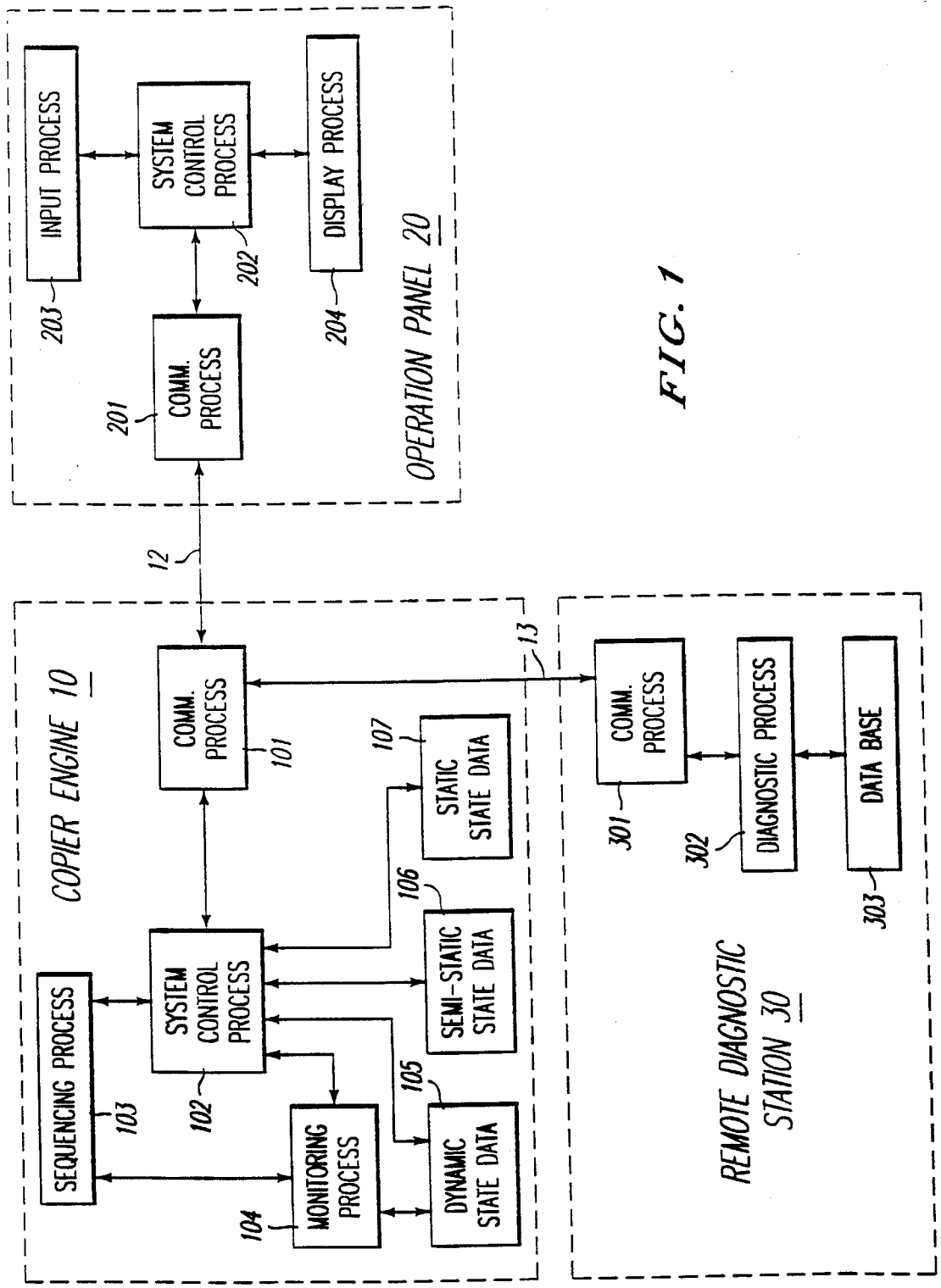
FIG. 1 depicts a functional system overview under which the present invention can be applied.

FIG. 1 illustrates a preferred embodiment of the present invention including a copier engine 10, operation panel 20, and remote diagnostic station 30. However, the present invention is not limited to copier devices, and can be applied to other business equipment devices, such as a printer or facsimile, which has means which are described below.

In the following illustration, the target device in FIG. 1 is a copier engine 10. The target device 10 includes means to store Static State Data 107, which does not change over the life of the device, such as the model number, serial number, model characteristics and the like. Target device 10 includes means to store Semi-Static State Data 106, which may change over the life of the device infrequently, such as the ROM version, option configuration, and the like.

In addition, the target device has means to store Dynamic State Data 105, which changes according to the mechanical state of the device, such as the paper status in the tray, oil, toner, number of prints, sensitivity of the photoreceptor, paper path and location, and the like. In order to store the dynamic state of the device, the target device 10 includes Monitoring Process 104 to monitor the state of device 10. Overall system activities are coordinated by System Control Process 102.

At power-on time, System Control Process 102 not only brings up the target device 10, but also establishes the communication with attached devices by first checking the physical connection and then establishing the communication by means which will be described below.

Copier engine 10 is idle until a user specifies some function through Operation Panel 20. During the idle time, however, System Control Process 102 continuously monitors its state through Monitoring Process 104. If abnormal states are detected, System Control Process 102 sends data to Communication Process 101, which codes data and sends the coded data to the Operation panel 20 through communication media line 12. Communication Process 201 sends acknowledgement, decodes data and sends it to System Control Process 202. System Control Process 202 then notifies the state of Copier Engine 10 through Display Process 204.

If communication line 13 to Remote Diagnostic Station is connected, System Control Process 102 can send a message to get the attention of Remote Diagnostic Station 30 to notify station 30 of an abnormal state.

Input Process 203 receives input from a user and sends the data to System Control Process 202, which then echoes back the input through Display Process 204, so that the user can get feedback of his/her input. The data from the user is then coded in Communication Process 201. The coded data is then sent to Copier Engine through line 12.

Communication Process 101 then sends an acknowledgement to 201, decodes the received data and sends the decoded data to System Control Process 102. During the actual copying, Sequencing Process 103 sequences events according to timing requirements. Remote Diagnostic Station 30 is connected with Copier Engine 10 through line 13, which can be a telephone line, RS232 line, or any other suitable communication means. Communication process 301 acts similarly as process 101 and process 201 of engine 10 and panel 20, respectively.

Diagnostic Process 302 is an intelligent process which can communicate interactively with Copier engine 10 based upon the responses it receives and data accumulated in the Data Base 303.

Figure 2:
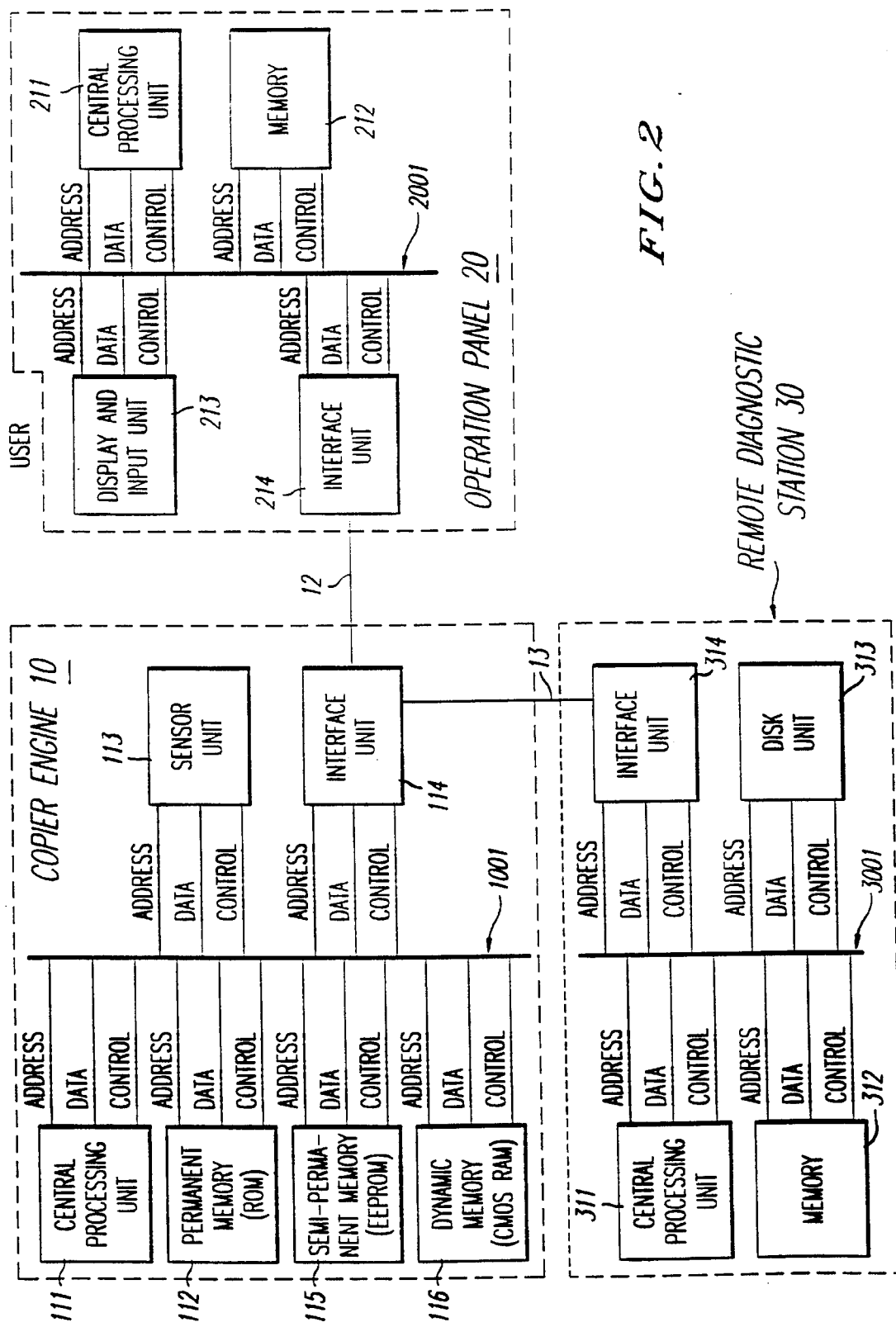
FIG. 2 depicts the hardware aspects of an implementation of the present invention.

FIG. 2 illustrates hardware features utilized to implement the present invention. All devices 10, 20, 30 have buses 1001, 2001, and 3001, which connect Interface Units 114, 214, and 314 respectively. Depending upon the model, a bus could have more units. Sensor unit 113 senses the mechanical states of the target device which must be stored as Dynamic Data, such as paper tray, voltage and paper path.

Memory 112 holds Static State Data 107 as a permanent memory (such as ROM). Memory 115 stores Semi-Static State Data 106 in changeable memory which does not require power, such as EEPROM, or which uses low power and can be supported by a battery (CMOS RAM). Memory 116 stores Dynamic State Data 105 in a changeable memory, which does not require power or which uses low power and can be supported by a battery.

Display and Input Unit 213 controls input keys and displays, such as lights and LCD. Disk unit 313 holds the data base. If the communication line 13 is not connected regularly or gets connected only when diagnostics are needed, the Interface Unit 114 has a means to notify Central Processing Unit 111 that line 13 is connected, such as an interrupt caused by mechanical means of physical connection.

FIG. 3 illustrates a preferred embodiment of encoding according to the present invention. However, other encoding such as ASN.1 (1987) can be used instead. The encoding scheme in FIG. 3 consists of sending Type, Length and Value (TLV) encoding. Bit 7 of Type is set to 0 while bit 7 of Length is set to 1. Values can take any bit combination. The encoding is binary to save the length of the data communication. Combined with the information field, up to 120 types (4 information×30 types) can be defined. One method to extend the type is to set all low 5 bits to 1. The terminator of this extension is two bytes of 00H. Using Composite in the information field, more than one information can be sent as follows:

010xxxxx L1 T2 L2 V2 T3 L3 V3 where L1 is the byte length of T2 through V2. L2 is the byte length of V2, and L3 is the byte length of V2. Composite is not limited to two.

Table 1 below shows codes for Type and Value. These codes are shown as an illustration, and actual implementation may vary depending upon the application.

TABLE I

| Type and Value | | |
|---|---|---|
| Information | Type | Content |
| 00 | 1 | Acknowledgement |
| 00 | 2 | Identify |
| 00 | 3 | # of Copies |
| 00 | 4 | Start |
| 00 | 5 | Done |
| 00 | 6 | Inquiry |
| 00 | 7 | Report |
| 00 | 8 | Address Content Report |
| 00 | 9 | Parameter Report |
| 01 | 1 | Command Not Understood |
| 10 | 1 | Composite Acknowledgement |
| 11 | 1 | Jam |
| Identify Values | | |
| | 1 | Copier Engine |
| | 2 | Operation Panel |
| | 3 | Diagnostic |
| Inquiry Values | | |
| | 1 | Identity |
| | 2 | Model |

FIG. 4 illustrates the establishment of communication between engine 10 and operation panel 20 of FIGS. 1 or 2 after power-on. Both engine 10 and operation panel 20 go through power on reset sequence. At step 1, operation panel 20 finishes the reset and sends its assigned value to engine 10. However, engine 10 is still busy with reset and cannot receive the data through the interface unit 101.

At step 2, engine 10 is ready and sends the assigned value to panel 20. Step 3 shows the acknowledgement from panel 20 to engine 10. In a preferred embodiment, the receiving side must return the acknowledgement with the received Type.

In FIG. 4, step 4 illustrates that a First Identify has timed out and another attempt should be made.

Step 5 illustrates that the connection has been established.

Step 6 illustrates an example of the number of copies specified and the acknowledgement in step 7 reflects the number of copies (here, 3 copies).

Step 8 illustrates the start of the copying sequence, and step 9 indicates the corresponding acknowledgement.

Step 10 illustrates the communication of a paper jam, and step 11 illustrates the corresponding acknowledgement of that paper jam.

FIG. 5 illustrates the process of establishing the connection between Diagnostic Station 30 and Copier Engine 10 of FIGS. 1 and 2. It is assumed that the engine power is on. FIG. 5 illustrates the use of Composite information field on lines 4 and 6. If Composite is not used, communication such as lines 10 through 12 is needed.

Step 1 in FIG. 5 illustrates the identifying of the diagnostic system, and step 2 illustrates the acknowledgement of the identification.

Step 3 illustrates the identification inquiry, and step 4 illustrates a composite acknowledgement.

Step 5 inquires as to the model identification, and step 6 is the corresponding acknowledgement.

Step 7 asks for a report of parameters and, as an illustration, step 8 illustrates the command is not understood.

Step 9 illustrates a reporting of address, and steps 10, 11 and 12 reflect the acknowledgement, report and acknowledgement, respectively.

FIG. 6 shows an example of another embodiment of the present invention in which an operation panel 1 can control different types of engine models identified as Engine Model 1, Model 2 and Model 3.

FIG. 7 shows an embodiment of the invention in which different operation panels such as panels 1, 2 or 3 can control the same engine models identified as engine model 1.

Figure 8:
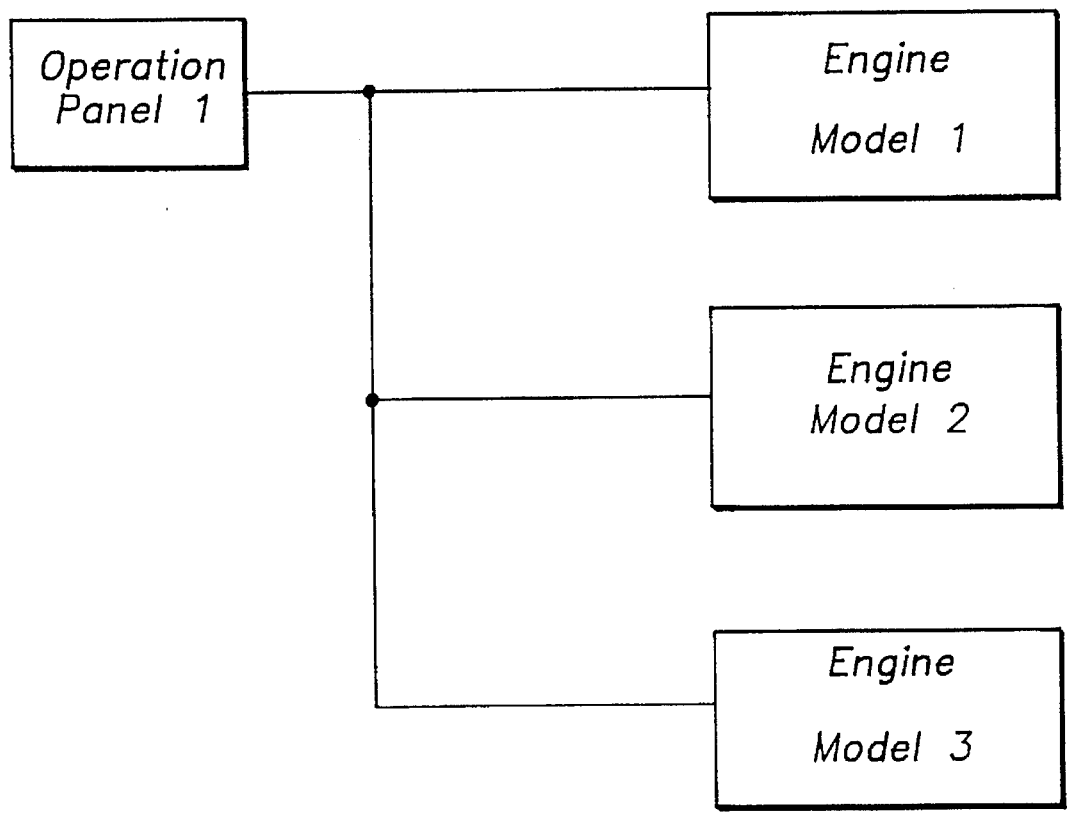

Finally, FIG. 8 shows an operation panel 1 controlling different engine models, identified as engine models 1, 2 and 3. In FIG. 8, operation panel 1 could control models 1, 2 or 3 by a suitable bus interconnection and suitable multiplexing capability.

In conclusion, the present invention provides a means and corresponding method for controlling, monitoring and communicating with office equipment devices by using the following:

Means to control various activities of the system (System Control Process)

Means to store static data (Static State Data)

Means to store semi-static data (Semi-Dynamic State Data)

Means to store dynamic data (Dynamic State Data)

Means to monitor the state of the device (Monitoring Process)

Means to get the state of device from the monitoring means and store the state into the storage of dynamic data (Monitoring Process→System Control Process)→ Dynamic State Data)

Means to communicate with other devices such as RS232 or modem/telephone (Communication Process)

Means to identify itself to other devices (Communication Process)

Means to exchange commands and data such as reply (Communication Process)

Means to interpret commands (System Control Process)

Means to take actions based upon the commands (System Control Process)

Means to send results of actions (System Control Process→Communication Process)

Means to notify when the new communication line is established (Communication Process→System Control Process: Interface Unit—interrupt→CPU)

The foregoing description of the preferred embodiment of the present invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments and with various modifications as are suited to the particular use contemplated. It is intended that the scope of the present invention be defined only by the claims appended hereto.

What is claimed is:

1. An apparatus for controlling and communicating with a business office device such as a facsimile, copier or printer, comprising:

a business device engine such as a facsimile, copier or printer for providing a facsimile document, a photocopy of a document, or a printed document, respectively, said business device engine including communication processor means;

an operation panel for controlling operation of said business device engine, said operation panel including communication processor means for communicating with said communication processor means of said business device engine;

means for storing static state data representing characteristics of said business device engine which do not change over the life of said business device engine, including at least one of a serial number and model characteristics;

means for storing semi-static state data which are infrequently changed over a life of said business device engine including at least one of a ROM version and an option configuration;

means for storing dynamic state data which change according to a mechanical state of the business device engine;

monitoring processor means for monitoring a state of said business device engine; and system control processor means for controlling system activities of said business device engine, wherein said operation panel includes means for encoding control data in a format including type, length and value which is to be transmitted to the business device engine.

2. An apparatus for controlling and communicating with a business office device such as a facsimile, copier or printer, comprising:

a business device engine such as a facsimile, copier or printer for providing a facsimile document, a photocopy of a document, or a printed document, respectively, said business device engine including communication processor means;

an operation panel for controlling operation of said business device engine, said operation panel including communication processor means for communicating with said communication processor means of said business device engine;

means for storing static state data representing characteristics of said business device engine which do not change over the life of said business device engine, including at least one of a serial number and model characteristics;

means for storing semi-static state data which are infrequently changed over a life of said business device engine including at least one of a ROM version and an option configuration;

means for storing dynamic state data which change according to a mechanical state of the business device engine;

monitoring processor means for monitoring a state of said business device engine and outputting the state which has been monitored;

system control processor means for controlling system activities of said business device engine;

means for communicating the state of said business device engine received from said monitoring processor means; and means for storing the state of said business device engine into said means for storing dynamic state data.

3. The apparatus as in claim 2, wherein said business device engine includes means for identifying itself through said communication processor means of said business device engine.

4. The apparatus as in claim 3, wherein the communication processor means of the business device engine includes means for exchanging commands and data between said business device engine, said operation panel and a remote diagnostic station.

5. The apparatus as in claim 4, wherein said system control processor means includes means for interpreting said commands.

6. The apparatus as in claim 5, wherein the business device engine includes means for executing said interpreted commands.

7. The apparatus as in claim 2, further including means for indicating when a communication line is established between said communication processor means of said business device engine and said system control processor means.

* * * * *

UNITED STATES PATENT AND TRADEMARK OFFICE
CERTIFICATE OF CORRECTION

PATENT NO. : 5,568,618
DATED : October 22, 1996
INVENTOR(S) : TETSURO MOTOYAMA

It is certified that error appears in the above-indentified patent and that said Letters Patent is hereby corrected as shown below:

In column 4, line 12, change "T2 through V2" to --T2 through V3--.

In column 4, line 13, change "length of V2" to --length of V3--.

Signed and Sealed this

Twenty-ninth Day of April, 1997

Attest:

BRUCE LEHMAN

Attesting Officer

Commissioner of Patents and Trademarks